United States Patent
Aarnio et al.

(10) Patent No.: US 7,117,020 B2
(45) Date of Patent: *Oct. 3, 2006

(54) SYSTEMS AND METHODS FOR PRESENTING AND/OR CONVERTING MESSAGES

(75) Inventors: Ari Aarnio, Espoo (FI); Sharma Dipanshu, Helsinki (FI)

(73) Assignee: Nokia Corporation, Espoo (FI)

( * ) Notice: Subject to any disclaimer, the term of this patent is extended or adjusted under 35 U.S.C. 154(b) by 128 days.

This patent is subject to a terminal disclaimer.

(21) Appl. No.: 10/919,703

(22) Filed: Aug. 17, 2004

(65) Prior Publication Data

US 2005/0059426 A1   Mar. 17, 2005

Related U.S. Application Data

(63) Continuation of application No. 09/585,994, filed on Jun. 2, 2000, now Pat. No. 6,801,793.

(51) Int. Cl.
*H04M 1/00* (2006.01)

(52) U.S. Cl. .................... 455/566; 455/550.1; 455/418

(58) Field of Classification Search ................ 455/566, 455/418–420, 414.3, 550.1, 552.1, 466, 567; 704/260; 709/270, 229, 202, 203
See application file for complete search history.

(56) References Cited

U.S. PATENT DOCUMENTS

| | | | |
|---|---|---|---|
| 5,548,814 A | 8/1996 | Lorang et al. | |
| 5,704,029 A | 12/1997 | Wright, Jr. | |
| 5,724,410 A | 3/1998 | Parvulescu et al. | |
| 5,754,227 A | 5/1998 | Fukuoka | |
| 5,918,013 A | 6/1999 | Mighdoll et al. | |
| 5,948,066 A | 9/1999 | Whalen et al. | |
| 5,966,451 A | 10/1999 | Utsumi | |
| 5,983,073 A | 11/1999 | Dizik | |
| 6,212,175 B1 | 4/2001 | Harsch | |
| 6,249,808 B1 | 6/2001 | Seshadru | |
| 6,253,326 B1 | 6/2001 | Lincke et al. | |
| 6,269,336 B1 | 7/2001 | Ladd et al. | |
| 6,313,734 B1 * | 11/2001 | Weiss et al. ................ 340/7.29 |
| 6,430,624 B1 | 8/2002 | Jamtgaard et al. | |
| 6,549,221 B1 | 4/2003 | Brown et al. | |
| 6,697,796 B1 * | 2/2004 | Kermani ......................... 707/3 |

FOREIGN PATENT DOCUMENTS

| WO | WO 99/52032 | 10/1999 |
|---|---|---|
| WO | WO 99/62268 | 12/1999 |

* cited by examiner

*Primary Examiner*—Erika A. Gary
*Assistant Examiner*—Kamran Afshar
(74) *Attorney, Agent, or Firm*—Cohen, Pontani, Lieberman & Pavane

(57) ABSTRACT

For a text message received by a mobile terminal, some or all of the message is converted to voice-based content, depending upon the user's preference or upon the capability of the wireless device's display. When the display of the mobile terminal is too small to accommodate a large text-based message, a software module converts the text-based content to voice-based content. The voice-based content is then output to a speaker in the wireless device. For received messages of more than one type of content, only the portions of the message that are within the capabilities of the receiver are outputted, or converted to another type of content if possible.

21 Claims, 3 Drawing Sheets

SYSTEMS AND METHODS FOR PRESENTING AND/OR CONVERTING MESSAGES

CROSS-REFERENCE TO RELATED APPLICATIONS

The present application is a continuation under 35 U.S.C. §120 of U.S. patent application Ser. No. 09/585,994, filed on Jun. 2, 2000 now U.S. Pat. No. 6,801,793. The aforesaid patent application is incorporated by reference in its entirety.

BACKGROUND OF THE INVENTION

1. Field of the Invention

The invention relates to configuring a mobile receiver device, such as a cell phone, to output to a user the maximum amount of a received message.

2. Description of the Related Art

Wireless communication devices are fast becoming the communications media of choice for transmitting and communicating data between users of the devices. Many types of wireless devices are currently being used, such as cellular phones, wireless telephones, personal digital assistants (PDAs), laptop computers and other devices with small displays for displaying text and icons to the users of the devices. The strong push in current wireless technology development is for increasingly smaller devices with greater computing power so that businessmen, students, and other users can always be in contact with the important people in their lives while maintaining adequate communication power to receive and transmit all of the data and information which has an impact on them.

Current standards and specifications in the wireless environment require that wireless markup language (WML) be used for browsing. The well-known wireless application protocol (WAP) specifies that WML be used for communication and browsing for all mobile devices. This is analogous to the use of hypertext markup language (HTML) in Internet applications where HTML is used to create the web pages through which web browsers "surf" the Internet. As will be appreciated by those skilled in the art, HTML is particularly well-suited for web browsers presented on a typical computer screen, usually a 15", 17" or 19" color monitor. This provides nearly unlimited space for text messages and content. In contrast, WML is designed for wireless devices with very small screens or displays, and so there is much less room for displaying data, messages, text and other content on a wireless device. This lack of display space creates problems when displaying sizable content on wireless devices since when the content becomes larger than the small screen can display, it must be "wrapped around" the screen or otherwise segmented, and the entire content cannot be seen at one time on the display.

There thus is a need for a method for converting content, such as text-based content, which relies on other markup language protocols than HTML for display of content that cannot be fully displayed on a small screen to a user.

In addition, since not all wireless devices have the same ability to handle messages, it is possible that an incoming message may have more components than the receiver device can output. There is therefore also a need for a method for outputting only the portions or components of an incoming message that are compatible with the receiver device.

SUMMARY OF THE INVENTION

In accordance with the present invention, the capabilities of a message receiver device, such as a cell phone, is determined. For example, the maximum length is determined of a text message that can be displayed on a display of the receiver, that is the number of characters of a particular font size that can be presented on the receiver's display. Alternatively, it is determined whether the device can present one or more of text messages, image messages, sound messages, and voice messages, where images messages includes still images and moving images (i.e., videos). When a message is received, it is determined whether the receiver is capable of outputting the entire message or only a portion. The portion of the message that cannot be output is either suppressed or is converted to another form of output recognizable by a user of a device. For example, if a display of the receiver device, such as a cell phone, does not have the capacity to display the entirety of a received text message due to, for example display space limitations of the display, the portion of the message which cannot be displayed is converted to another form which is accessible to, and recognizable by, the user, such as an audio output.

In accordance with another aspect of the invention, when a received message comprises more than one form, such as a text portion, an audio portion, and an image or graphical portion, only those portions of the message which the device is able to output are actually output by the device. Alternatively, a portion of the received message is output in another form, either instead of its original form or in addition to its original form, even though the device is capable of outputting the initial form. For example, a received message may include text and a picture; both can be and are outputted by the device, but the text is also output as speech.

In a preferred embodiment of the present invention, the devices are wireless devices which employ a WML-based browser, although other forms of browsers may be implemented. Moreover, the present invention is implementable with other than wireless devices, especially when such devices, for example laptop computers and PDAs, are equipped with small displays that cannot accommodate large volumes of text. The present invention also may provide voice recognition capability which will allow for fast and efficient access to data by a user which would otherwise be required to use a manual input device such as a keyboard, mouse, trackball, keypad or capacitive input device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
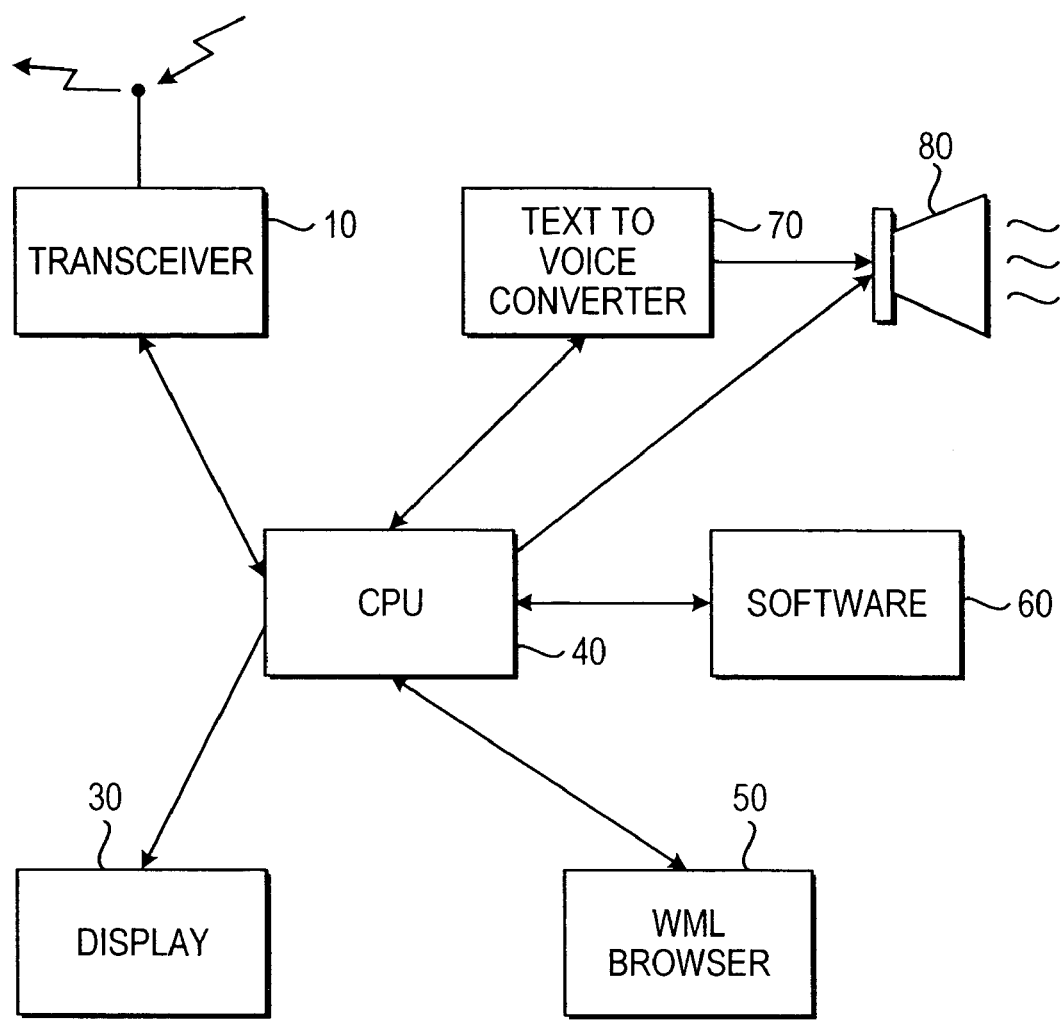
FIG. 1 is a block diagram of a wireless device in accordance with the present invention.

In FIG. 1 is shown a block diagram of a wireless device in accordance with the present invention. The wireless device is any wireless device which can communicate data and other information between users of wireless devices, between users of wireless devices and users of landline based instrumentalities, or between a user and the internet. Thus, the wireless device may be a mobile telephone, PDA, personal computer, laptop computer, beeper or other advanced communicator currently on the market. It is envisioned that new wireless devices will be developed in the future which will also fall within the scope of the present invention. Any device which can convert text-based content to another form of content to be output to a user, and equivalents thereof, is within the scope of the present invention. Similarly, the other form of content may be within a wide ranging genus of forms of content. Without intending to limit the invention in any way, the other forms of content may be pure data, voice-based content, vision-based content (such as still and moving images), tactile-based content, audio-based (other than voice) content, or smell-based content.

The wireless device of FIG. 1 conventionally includes a transceiver 10 which receives and transmits electromagnetic signals which comprise digital and/or analog and/or packet data having messages which are to be transmitted to and from users. The display device is appropriate to display text and optionally images and includes a liquid crystal display, thin-film transistor (TFT) display, a flat panel display, cathode ray tube (CRT) or other display which is a low-power consumption display appropriate for a portable, mobile wireless-type device.

The wireless device also preferably has a central processor unit (CPU) 40 which manages, controls, monitors and provides all of the functionality required to run the wireless device and is able to process data that is received by the device as incoming and outgoing messages. The wireless device further includes a WML browser module 50 which allows the user of the wireless device to browse through the text-based content at any time. The WML browser 50 relies on WAP and is therefore constrained by the protocols set up by WAP. Since WAP and WML have become standard in wireless devices which utilize wideband, code division multiple access (WCDMA) data (as is the case with virtually all such devices), the constraints of WAP and WML are strictly imposed on the wireless device. WML is capable of displaying images and is responsible for downloading and/or displaying text-based content. While WAP and WML are currently implemented for wireless devices, other browser protocols and markup languages could conceivably be used in the future. The inventive systems and methods will be readily implementable with all such protocols and markup languages whenever the size of display 30 is an issue in displaying text-based content, as will be described in more detail below. The present invention will be described throughout with respect to the WML browser.

The basic problem with all displays 30 in mobile devices is that such displays are smaller than normal-sized computer screens. Computer screens are rarely smaller than about 15" (14.4" diagonal viewing) and may be as large as desired since they need not be portable. However, mobile wireless devices are intended to be portable and therefore, the displays 30 must be small as a practical matter. Small screens or displays as little as two inches diagonal have exist and are found in current wireless devices, such as televisions. However, sizable text-based content simply cannot be displayed on such small screens in their entirety because the text will be too small for the user to read easily. This problem has not effected non-mobile computer screens since they are big enough to accommodate virtually any sized text-based content, including images and icons.

Thus, wireless devices oftentimes will not be able to display the entirety of a text-based message at a single time to the user. This leaves the user in the uncomfortable position of having to ignore the message until he or she can fully view it by manipulating the wireless device, or attempting to manipulate the wireless device while driving or while engaged in some other, potentially dangerous, activity. Moreover, the user may simply not wish to wait for the rest of the text-based content and so will desire to receive it in some other content form, such as voice-based content.

In accordance with the invention, a software module 60 is provided to the wireless device which determines the capabilities of the wireless device and whether the text-based content exceeds the text display capability of the display 30 for a selected text font size and implements the WML browser 50 to set a limitation on the length (i.e., number of characters) of the text-based message that may be displayed on the display 30. It will be appreciated that software module 60 may be a separate module, or may be integrated in CPU 40 for convenience. Additionally, software residing in module 60 may be written in any appropriate computer language such as C++, JAVA, VISUALBASIC, or others, or may be simply executable code that is permanently burned into module 60. The software module may alternatively reside at least in part in the wireless network servicing the wireless device. Thus, the capabilities of the wireless device may be stored in memory of the wireless device or transmitted by the wireless device to the wireless network which then determines how to modify the message to be transmitted, if at all.

When the software in module 60 determines, for example, that the length of the received text-based message exceeds the limitations set by the WML browser 50 and therefore, for example, would exceed the size of the display 30 or its capabilities, the excess text (or the entire text message, if desired) is converted by CPU 40 and/or software 60 to a "spoken" voice which will essentially read the message to the user. The voice is heard over a conventional speaker 80 and may be a female or male voice. The voice may be of a variable pitch and could therefore emulate a child or even an animal if so desired. The voice may also be that of a particular user-selected person, such as a spouse, whose voice has be preprogrammed into the device. Alternatively, if the received message exceeds other of the capabilities of the receiver, only those portions of the received message are outputted by the receiver. An example of such an event would be if the message contained an audio component, an associated text component, and an associated image component. If the receiver had the capability of outputting only the audio and text component, the image component would be detected and suppressed by the CPU 40 and/or software 60, and the remainder of the received message would be output by the receiver device.

Figure 2:
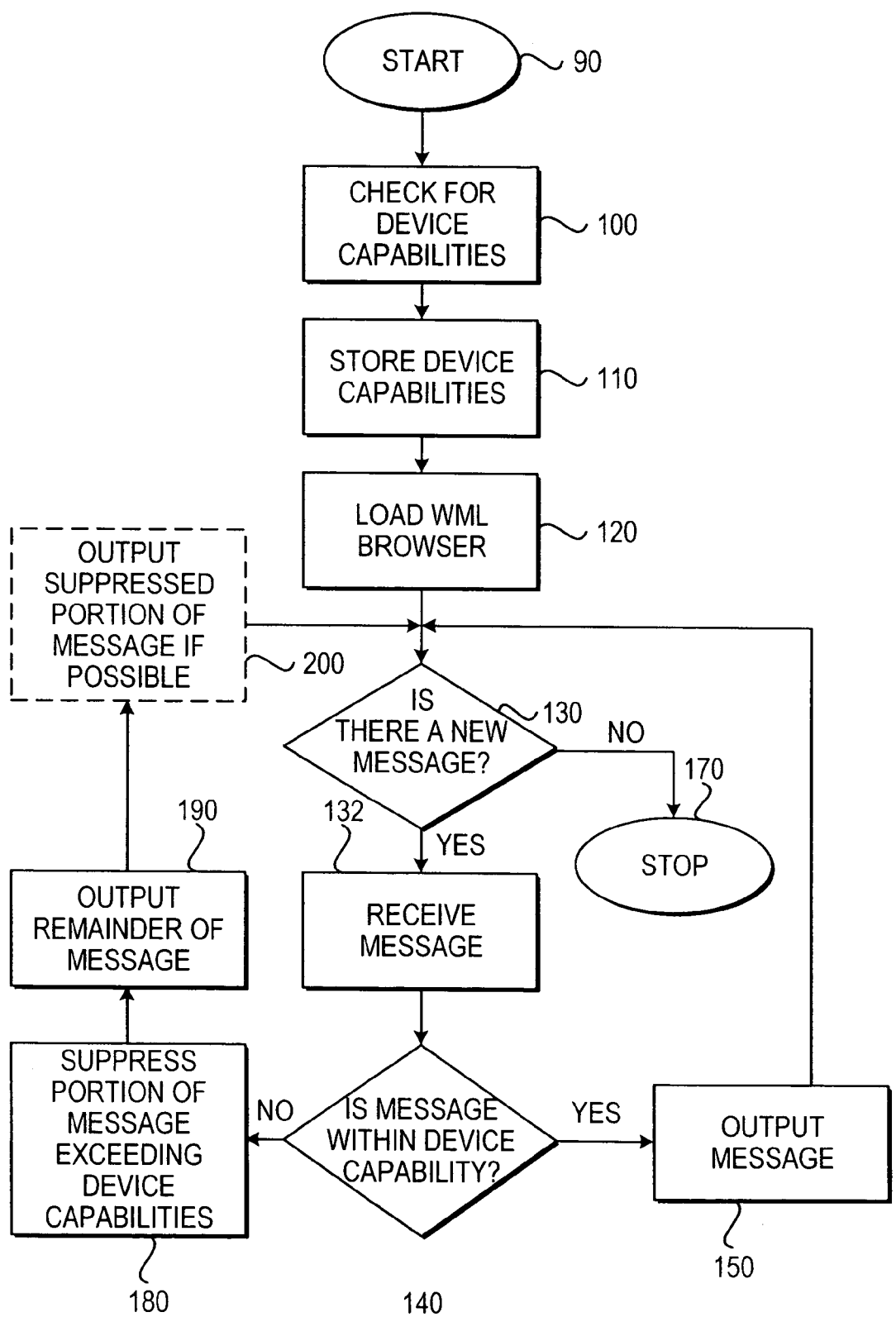
FIG. 2 is a flow chart of a preferred method of handling a message received by a wireless device in accordance with the present invention.

FIG. 2 is a flow chart which represents an exemplary method which may be programmed in software to accomplish the present invention. The method starts at step 90 and at step 100 the method checks the capabilities of the receiver device. For example, it is determined what types of messages can be outputted by the receiver, such as voice, text and/or images (still or moving), and for text messages the length of the text message that can be shown on the display of the receiver device. If the font size used in the display of the wireless device can be adjusted by the user, the limitation of text to be displayed would take this variable into account. Additionally, if the receiver device has more than one output means, such as more than one display, the capabilities of each output means are determined. The capabilities of the device are then stored, step 110, in a memory associated with the CPU 40 and/or software module 60 or in a memory of a server of the wireless network. At step 120, the WML browser 50 is loaded to the CPU 40.

At steps 130 and 132, a message is received by the wireless receiver device (if there is no new message, the method stops at step 170). The received message may comprise components in one or more formats, which may be linked, such as, for example, text, voice, sound, and visual (still and/or moving images, either pictures or graphical images). It is determined, at step 140, whether the message is within the capabilities of the receiver. If the message is within those capabilities, the entire message is output by the device for receipt by the user at step 150, and returns to step 130 to await a new message. However, if at step 140 it is determined that the message exceeds the capabilities of the receiver device, then at step 180 the portion of the message that exceeds these capabilities is suppressed or truncated, and the remainder of the message is output by the device at step 190. If the device is capable of outputting the suppressed portion of the message, that portion is output at optional step 200. For example, if the suppressed portion of the message is text, it is converted to audio and outputted through speaker 80.

Alternatively, if a received message is a text message, the entirety of the received message may be converted into a voice message and then outputted through the device's speaker, either instead of displaying the text message or in addition to displaying the text message.

Figure 3:
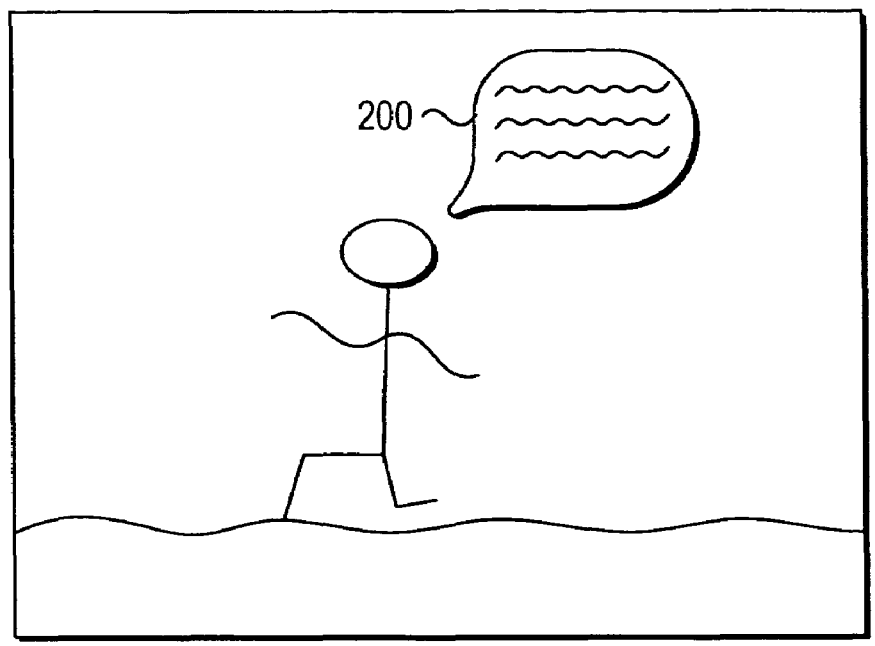
FIG. 3 is a drawing of a received message having two types of content.
Figure 4:
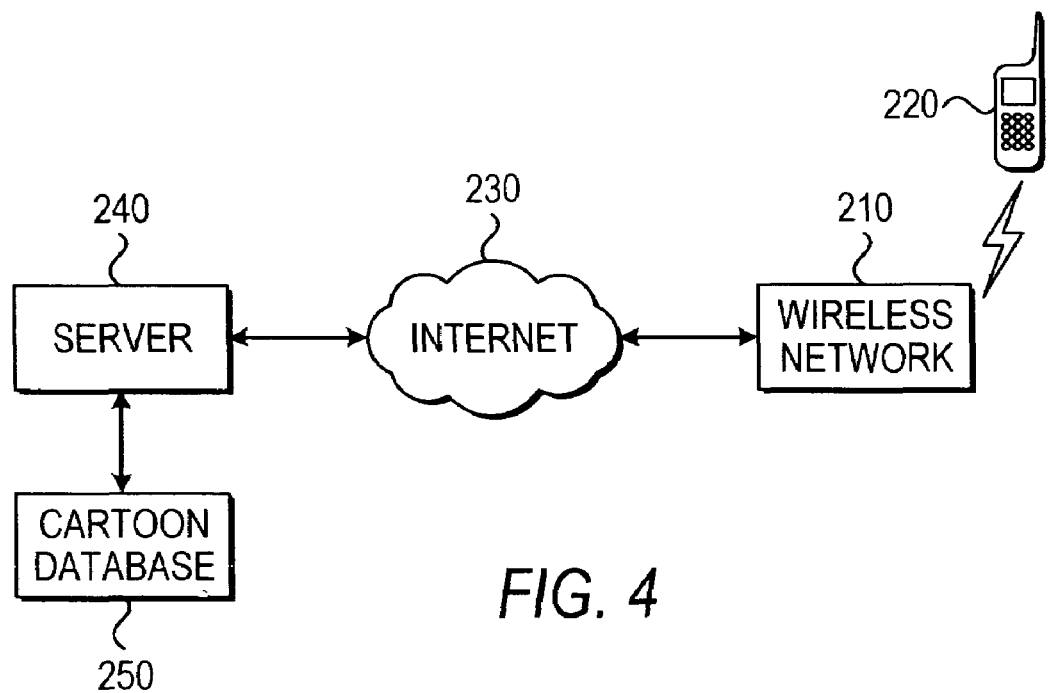
FIG. 4 is a block diagram of an embodiment of a wireless system employing the present invention.

Another example of a received message is depicted in FIG. 3 which shows a cartoon or comic strip frame image having a text message in a bubble 200. In accordance with the present invention, the entire image is output to the display of the mobile terminal, while the text message in the bubble 200 is converted to a voice signal and output by the speaker 80. Such a cartoon image may be sent to a user's mobile terminal by the system shown in FIG. 4. A wireless network 210 communicates wirelessly with a mobile terminal, shown as cell phone 220. The wireless network 210 may be connected to a server 240 directly or indirectly through the internet 230. The server 240, either in response to a request by the user's mobile terminal 220 or periodically through a subscription service, transmits to the user's mobile terminal 220 a comic strip message which the server 240 retrieves from a cartoon database 250.

The tone, pitch, loudness or other properties associated with the sound of a voice output may be selected so that a pleasing and informative voice will be associated with the messages that are read out to the user. Additionally, music, tones or and other sounds may be prompted to be played to the user in addition to, or in lieu of, the message when it is appropriate to do so. Additionally, a voice-converted message could be automatically routed to a voice mail storage system and retrieved by the user at a convenient time. Moreover, a graphical portion and a voice-based portion of a received message may be outputted by the receiver to the user simultaneously when the software module 60 contains software to separate graphical content from voice-based content or text-based content and indicates that both should be output simultaneously. All such embodiments and equivalents thereof are intended to be within the scope of the present invention.

The present invention overcomes the capability limitations of a receiver, for example by allowing graphical information and text messages to be displayed simultaneously, and the tail end of, or the entirety of, a received text message may be output audibly. Consequently, large volumes of data may be outputted by a wireless device in accordance with the present invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mobile terminal adapted for outputting more than one form of data comprising:
   a receiver for receiving a message having more than one form of data, said message comprising graphical content and one of text and voice content; and
   a converter for converting the message for output on said mobile terminal so that the more than one form of data is available for simultaneous output on said mobile terminal, the converter comprising a software module in said mobile terminal, the software module having instructions for segregating the graphical content from said one of text and voice content in the message for simultaneous output of the graphical content and said one of text and voice content on the mobile terminal.

2. The mobile terminal of claim 1, wherein said converter converts at least a portion of the text-based content of the message to a voice-based form.

3. The mobile terminal of claim 1, further comprising: means for forwarding said message to a voice mail storage memory in order to allow output of the forwarded message on the mobile terminal at a future time.

4. The mobile terminal of claim 3, further comprising: tone generating means for generating a tone when said message has been forwarded to said voice mail storage memory to prompt a user of the mobile terminal to access said message.

5. The mobile terminal of claim 1, further comprising: means for determining whether said mobile terminal is capable of outputting to output more than one form of data.

6. The mobile terminal of claim 5, wherein said means for determining comprises a software module.

7. The mobile terminal of claim 1, wherein said converter converts said message from a data format which is not configured to be output by said mobile terminal to a data format which is configured to be output by said mobile terminal.

8. The mobile terminal of claim 1, wherein the mobile terminal comprises one of a cellular telephone, a PDA, a pager, or a palmtop computer.

9. A software module for the output on a mobile terminal of a message comprising graphical content and one of text and voice content comprising:
  instructions for segregating said graphical content in said message from said one of text and voice content in said message,
  instructions for converting the one of text and voice content in said message into a format adapted for being simultaneously output with the graphical content; and
  instructions for simultaneously presenting said graphical content in a display of the mobile terminal and outputting said converted one of text and voice content.

10. The software module of claim 9, wherein the one of text and voice content is text content, and wherein said instructions for converting said one of text and voice content in said message into a format configured for simultaneous output with said graphical content converts at least a portion of the text-based content of the message to a voice-based form.

11. The software module of claim 9, further comprising instructions for: forwarding said message to a voice mail storage memory in order to allow output of the forwarded message on the mobile terminal at a future time.

12. The software module of claim 11, further comprising instructions for: generating a tone when said message has been forwarded to said voice mail storage memory to prompt a user of the mobile terminal to access said message.

13. The software module of claim 9, wherein said instructions for converting said one of text and voice content in said message into a format configured for simultaneous output with said graphical content converts said one of text and voice content from a data format which is not configured for output by said mobile terminal to a data format which is configured for output by said mobile terminal.

14. The software module of claim 9, wherein the mobile terminal comprises one of a cellular telephone, a PDA, a pager, or a palmtop computer.

15. The software module of claim 9, wherein said software module is stored in a network element and downloaded to the mobile terminal and/or said software module is stored on the mobile terminal.

16. A method for presenting data in a mobile terminal comprising the steps of:
  receiving, by the mobile terminal, a message comprising graphical content and one of text and voice content;
  determining whether the received message is within an output arrangement of the mobile terminal;
  if it is determined that the received message is within the output of the mobile terminal, outputting the received message; and
  if it is determined that the received message is not within the output of the mobile terminal, performing the sub-steps of:
    segregating the graphical content from said one of text and voice content in said message;
    converting the one of text and voice content in the message into a format arrangement of being simultaneously output with the graphical content; and
  simultaneously presenting said graphical content in a display of the mobile terminal and outputting said converted one of text and voice content.

17. The method of claim 16, wherein the one of text and voice content is text content, and wherein the step of determining whether the received message is within the stored output capability of the mobile terminal comprises the step of:
  determining whether the text content exceeds the text display capability of the mobile terminal.

18. The method of claim 17, wherein the sub-step of converting said one of text and voice content in said message into a format configured for simultaneous output with said graphical content comprises the step of: converting the text content into voice content.

19. The method of claim 18, wherein the sub-step of simultaneously presenting said graphical content in a display of the mobile terminal and outputting said converted one of text and voice content comprises the step of: outputting the converted text content as voice while displaying the graphical content.

20. The method of claim 16, wherein the step of determining whether the received message is within an output capability of the mobile terminal comprises the step of: retrieving said output capability from a storage location.

21. The method of claim 20, wherein said storage location is within the mobile terminal and/or within a network element.

* * * * *